United States Patent
Bolton et al.

(10) Patent No.: US 8,930,902 B2
(45) Date of Patent: *Jan. 6, 2015

(54) AUTOMATIC SELECTION OF LOWEST CONFIGURATION FEATURE LEVEL BY FUNCTIONALITY EXPLOITED

(75) Inventors: Stephen P. Bolton, Fleet (GB); Matthew A. Webster, Hook (GB); Winchester R. Joseph, Hursley (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/410,757

(22) Filed: Mar. 2, 2012

(65) Prior Publication Data

US 2013/0047139 A1    Feb. 21, 2013

Related U.S. Application Data

(63) Continuation of application No. 13/209,597, filed on Aug. 15, 2011.

(51) Int. Cl.
*G06F 9/44* (2006.01)
*G06F 9/445* (2006.01)

(52) U.S. Cl.
CPC .............. *G06F 9/44505* (2013.01); *G06F 8/71* (2013.01); *G06F 8/70* (2013.01)
USPC .......................................... 717/121; 717/120

(58) Field of Classification Search
CPC .............. G06F 8/20; G06F 8/36; G06F 8/61; G06F 8/71; G06F 9/44505
USPC ............................................................ 717/121
See application file for complete search history.

(56) References Cited

U.S. PATENT DOCUMENTS

| | | | |
|---|---|---|---|
| 5,603,034 A * | 2/1997 | Swanson | 717/111 |
| 5,613,101 A * | 3/1997 | Lillich | 709/230 |
| 6,519,767 B1 | 2/2003 | Cater et al. | |
| 6,754,896 B2 * | 6/2004 | Mishra et al. | 717/176 |
| 7,478,385 B2 * | 1/2009 | Sierer et al. | 717/174 |
| 7,506,336 B1 | 3/2009 | Ninan | |
| 7,600,219 B2 | 10/2009 | Tsantilis | |
| 2005/0268283 A1 * | 12/2005 | Clemm et al. | 717/121 |
| 2006/0161910 A1 | 7/2006 | Bonsteel et al. | |
| 2008/0320460 A1 * | 12/2008 | Miller et al. | 717/162 |
| 2010/0306757 A1 | 12/2010 | Becker et al. | |
| 2011/0078674 A1 | 3/2011 | Ershov | |
| 2012/0272228 A1 * | 10/2012 | Marndi et al. | 717/170 |

OTHER PUBLICATIONS

Rayns et al., Implementing Event Processing with CICS, IBM, Sep. 2009.*

* cited by examiner

*Primary Examiner* — Qing Chen
*Assistant Examiner* — Andrew M Lyons
(74) *Attorney, Agent, or Firm* — Jordan IP Law, LLC

(57) ABSTRACT

Methods and systems of generating product configuration files may involve receiving an identification of a set of features for a software product via a file editor interface. The lowest version of the software product that supports the set of features may be determined, wherein a configuration file can be generated based on the lowest version. In one example, the configuration file identifies the set of features and includes the lowest version as an attribute of the configuration file.

20 Claims, 3 Drawing Sheets

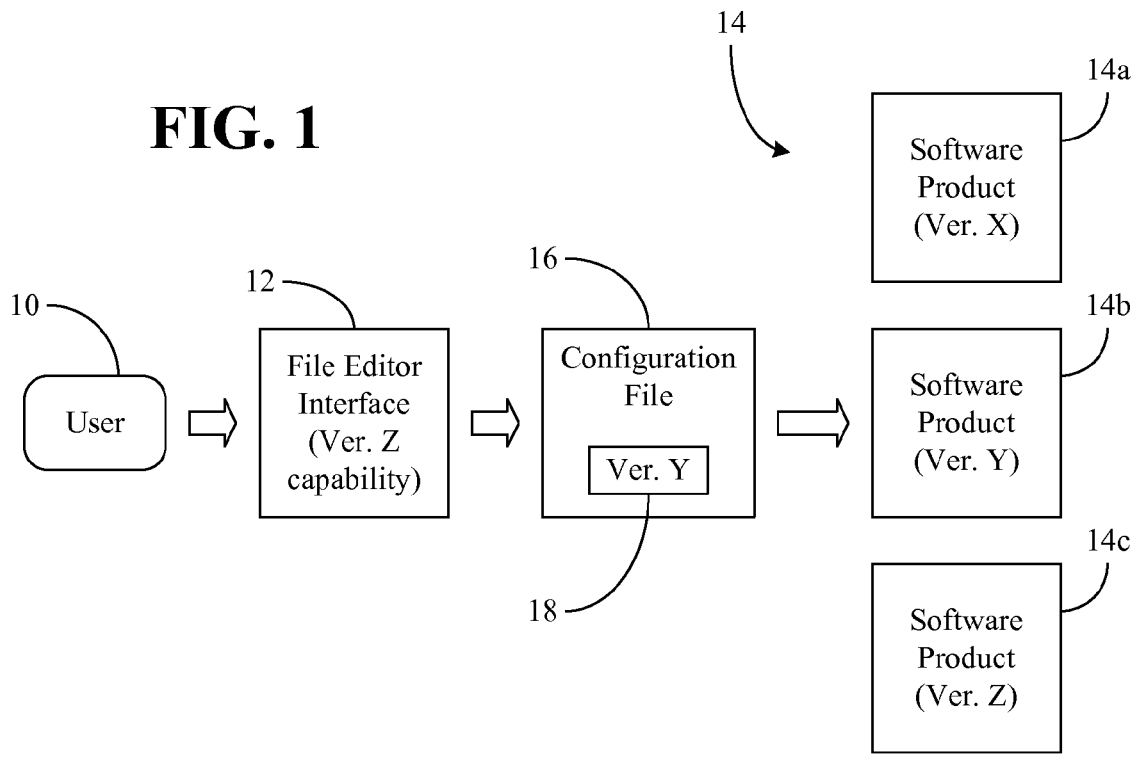
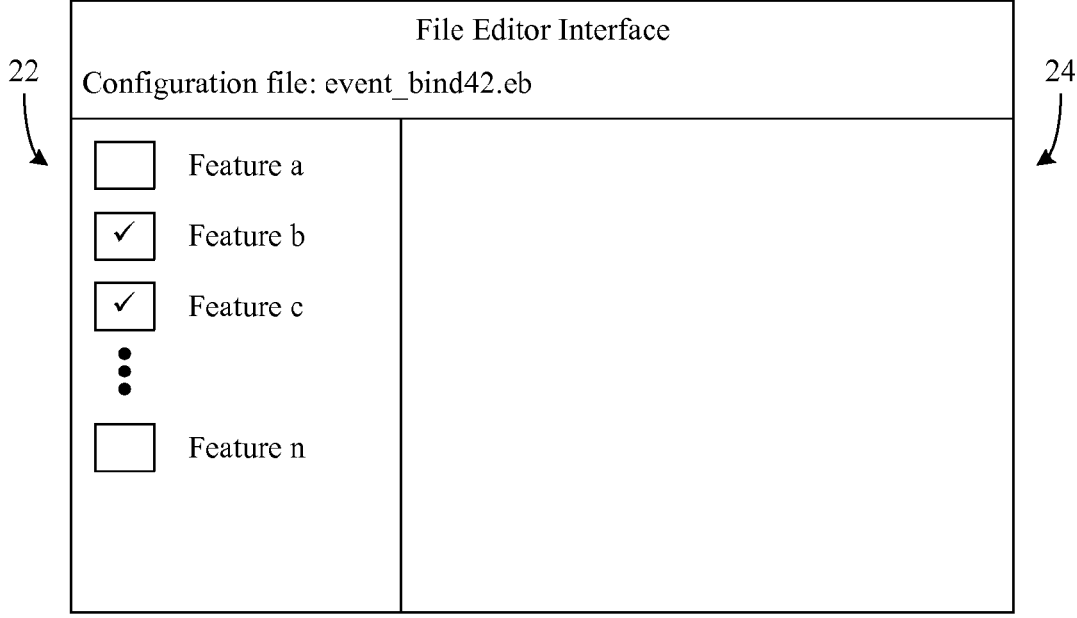

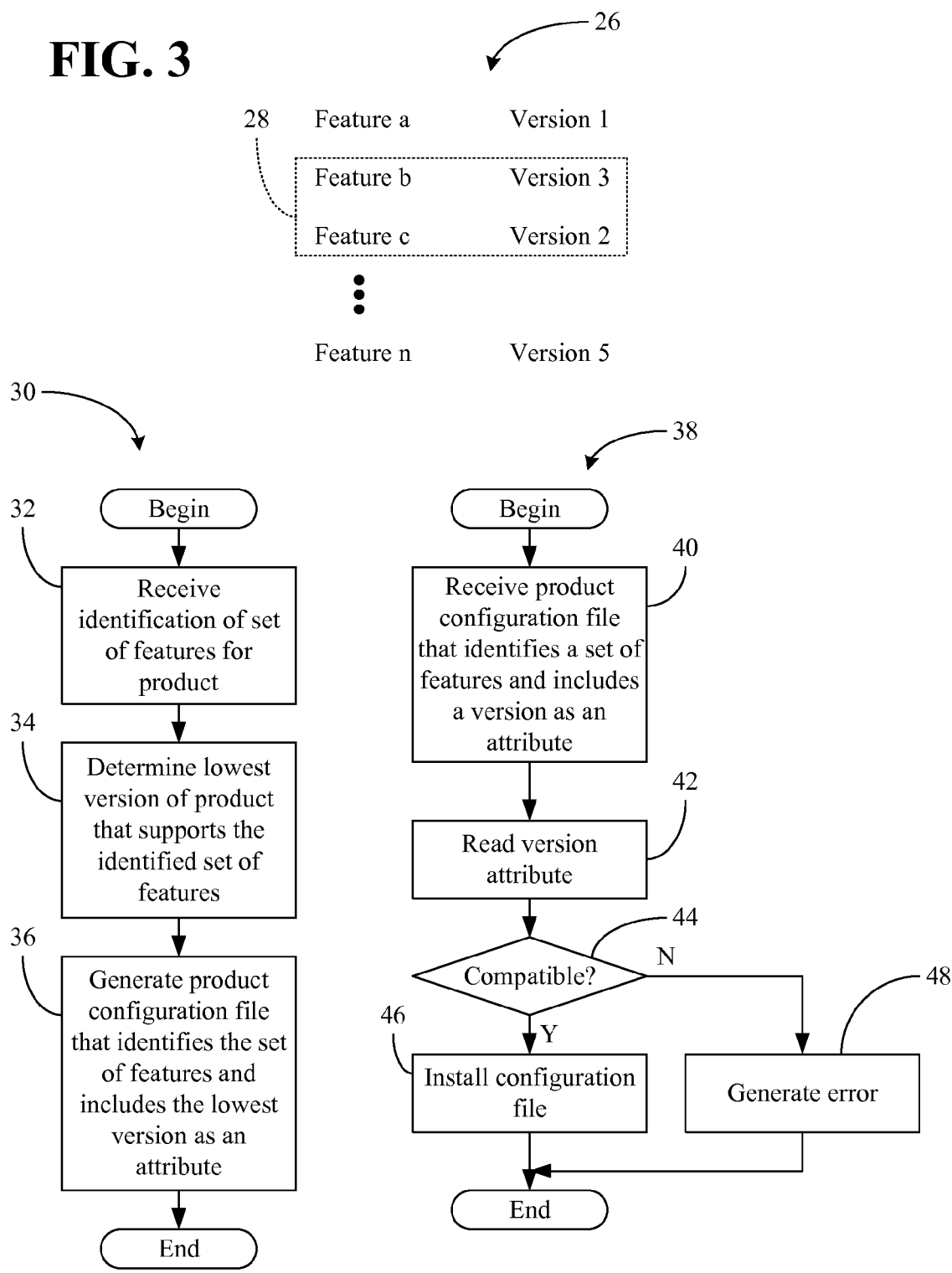

AUTOMATIC SELECTION OF LOWEST CONFIGURATION FEATURE LEVEL BY FUNCTIONALITY EXPLOITED

CROSS-REFERENCE TO RELATED APPLICATIONS

The present application is a continuation of U.S. patent application Ser. No. 13/209,597 filed on Aug. 15, 2011.

BACKGROUND

Embodiments of the present invention generally relate to the creation of configuration files for software products. More particularly, embodiments relate to the automatic selection of configuration file version levels to ensure maximum backwards compatibility.

In various computing system industries, software product upgrades may be periodically released, wherein each release has a different version level. Typically, a given product release can introduce new functionality that may involve the use of new application programming interface (API) functions in order to implement the new functionality in the host environment of the software product. Computer programmers may use "tooling" to create configuration files which, when deployed into the host environment, provide for the API functions selected at the time of the creation/coding of the configuration files. While conventional configuration file tooling techniques may be suitable under certain circumstances, there remains considerable room for improvement.

For example, some tooling solutions may change with each release of the software product. A challenge with regard to such an approach is that if an attempt is made to deploy configuration files created for one version of a product into an environment with a lower (e.g., earlier) version of the product, an error could result due to the usage of API functions that are unknown to the lower version of the product.

Other tooling solutions may be able to create configuration files for different versions of a software product. In such a case, the programmer may be first required to explicitly set the version level of the runtime environment, which can in turn restrict the API functions that are available to the programmer. If, however, the selected version level is too low, certain desired API functions may not be available to the programmer. If, on the other hand, the selected version level is too high (e.g., recent), compatibility with earlier versions may be unnecessarily sacrificed while unneeded API functions are available but unused.

BRIEF SUMMARY

Embodiments may involve a computer implemented method in which an identification of a set of features for a software product is received via a file editor interface. The method may also provide for determining a lowest version of the software product that supports the set of features, and generating a configuration file for the software product. The configuration file may identify the set of features and include the lowest version as an attribute of the configuration file.

Embodiments may also include a computer program product having a computer readable storage medium and computer usable code stored on the computer readable storage medium. If executed by a processor, the computer usable code can cause a computer to receive an identification of a set of features for a software product via a file editor interface, and determine a lowest version of the software product that supports the set of features. The computer usable code may also cause a computer to generate a configuration file for the software product, wherein the configuration file is to identify the set of features and is to include the lowest version as an attribute of the configuration file.

Other embodiments may provide for a computer implemented method in which one or more prompts are output via a file editor interface. An identification of a set of features for a software product may be received via the file editor interface, wherein the set of features includes one or more application programming interface (API) functions and the software product includes a server. The method can also provide for determining a lowest version of the software product that supports the set of features, and generating a configuration file for the software product. In one example, the configuration file includes an event binding file, identifies the set of features, and includes the lowest version as an attribute of the configuration file.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 1 is a block diagram of an example of a scheme of generating product configuration files according to an embodiment;

FIG. 2 is a block diagram of an example of a file editor interface according to an embodiment;

FIG. 3 is a block diagram of an example of a list of a plurality of features according to an embodiment;

FIG. 4A is a flowchart of an example of a method of generating product configuration files according to an embodiment;

FIG. 4B is a flowchart of an example of a method of installing product configuration files according to an embodiment.

DETAILED DESCRIPTION

Figure 5:
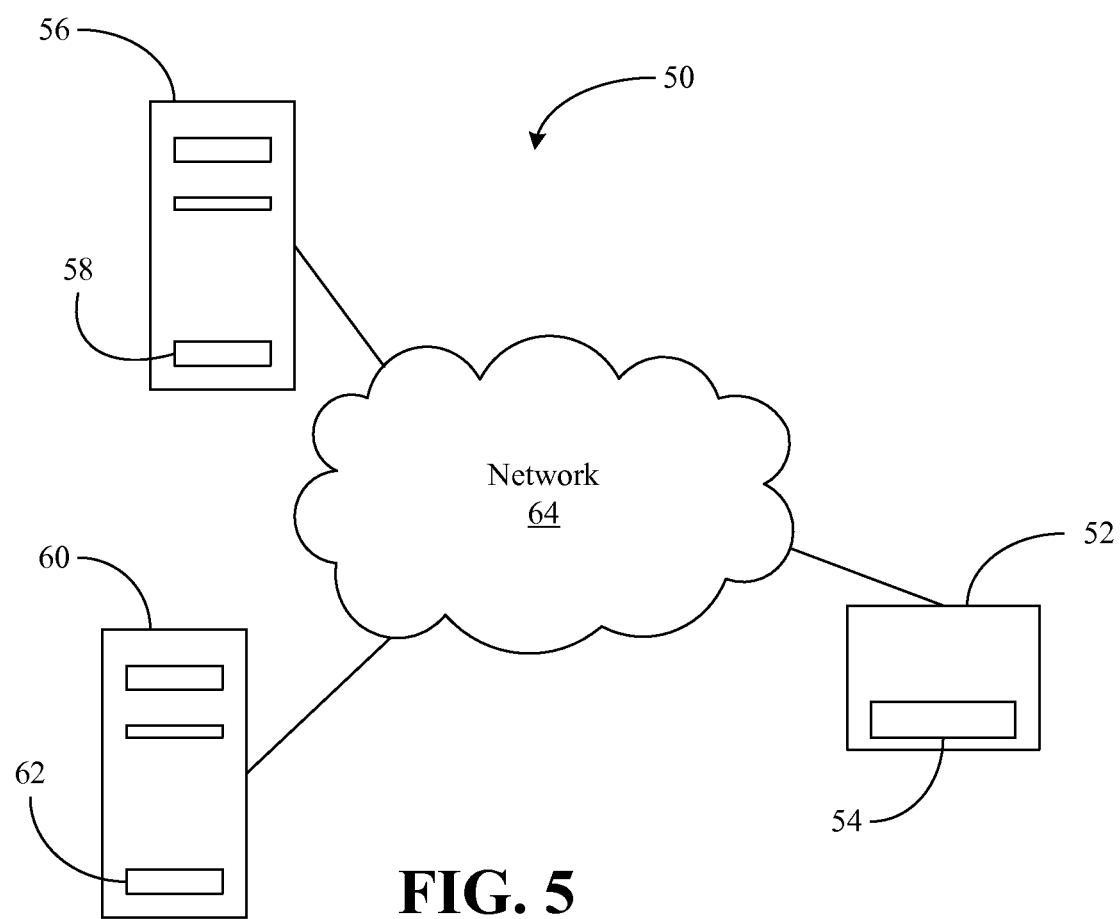
FIG. 5 is a block diagram of an example of a computing architecture according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a scenario is shown in which a user 10, such as a computer programmer, interacts with a file editor interface 12 in order to generate configuration files such as a configuration file 16 for a software product. In the illustrated example, the file editor interface 12 is able to generate configuration files for multiple product releases 14 (14a-14c) having different features and/or functionality. For example, the software product could be a customer information control system (CICS) server in which release 14a is designated as "Ver. X" and stores outgoing messages only to a message queue, whereas release 14b is designated as "Ver. Y" and might include the ability to transfer outgoing messages directly to a web server Hypertext Transfer Protocol (HTTP) address. In such a case, the configuration file 16 might be an event binding file that includes code to bind message creation events to HTTP addresses. Similarly, a subsequent product release 14c may be designated as "Ver. Z" and may include additional messaging functionality or other features not present in the previous releases 14a, 14b of the product.

As will be discussed in greater detail, the file editor interface 12 can automatically determine the lowest (e.g., earliest) version of the software product that supports the features selected by the user 10, and assigns that version to the resulting configuration file 16 even though the file editor interface 12 may be compatible with a higher version of the software product (e.g., Ver. Z). Thus, in the illustrated example, all of the features selected by the user 10 are supported by product releases 14c and 14b, but not by product release 14a (e.g., HTTP message binding was selected). The file editor interface 12 may therefore assign Ver. Y (i.e., the lowest version of the software product that supports the selected features) to the configuration file 16 by adding an attribute 18 to the configuration file 16 that indicates Ver. Y as the level of compatibility. Without the illustrated ability to automatically assign the lowest supported version level, the user 10 might manually either select Ver. X as the target host environment, which would eliminate the HTTP message binding functionality, or select Ver. Z as the target host environment, which would prevent the configuration file 16 from being installed in Ver. Y host environments.

Simply put, assigning the lowest version supported to the configuration file 16 may ensure maximum backwards compatibility for the configuration file 16. Moreover, by enabling the user 10 to select features without regard to version level, the illustrated approach exposes the user 10 to features that might not be supported in the current host environment. Accordingly, the software vendor may be able to "silently publicize" new features to users of older environments so that the users may be more likely to upgrade to newer versions of the product.

FIG. 2 shows a file editor interface 20 that may be used by a computer programmer to generate configuration files. The file editor interface 20, which could be part of a tooling solution, may be readily substituted for the file editor interface 12 (FIG. 1), already discussed. In the illustrated example, the user is prompted with a plurality of features 22 for a software product, and has selected "Feature b" and "Feature c" for inclusion in a configuration file ("event_bind42.eb") for the software product. As already noted, the features 22 could represent one or more API functions and/or other functionalities, and the configuration file may include an event binding file and/or other file that enables certain functionality with respect to the software product. The illustrated file editor interface 20, which also includes an authoring region 24 that enables the user to conduct other file editing/authoring activities, excludes version information from the user prompts. Excluding the version information from the user prompts can enable feature usage to drive the configuration level rather than the configuration level driving feature usage.

FIG. 3 demonstrates that a list 26 of features and their corresponding version levels may be maintained for the software product transparently from the user's perspective. In the illustrated example, Feature a was introduced with "Version 1" of the product, Feature b was introduced with "Version 3" of the product, Feature c was introduced with "Version 2" of the product, and Feature n was introduced with "Version 5" of the product, wherein the selected set of features 28 includes Features b and c. Thus, the file editor interface 20 (FIG. 2) may determine that Version 3 of the product is the lowest version of the product that supports the entire set of features 28 (i.e., Version 2 is too low because it does not support Feature b). Additionally, the file editor interface may determine that Version 5 is too high because Feature n is not used and may therefore fail to maximize backwards compatibility.

Turning now to FIG. 4A, a method 30 of generating product configuration files is shown, wherein the method 30 may be implemented in a file editor interface and/or tooling solution. Illustrated processing block 32 provides for receiving an identification of a set of features for a software product. As already noted, the set of features could include one or more API functions and the software product may include a server. Block 34 determines the lowest version of the software product that supports the identified set of features, and a configuration file may be generated for the software product at block 36. In the illustrated example, the configuration file identifies the set of features and includes the lowest version as an attribute such as attribute 18 (FIG. 1). In one example, the configuration file is an event binding file.

FIG. 4B shows a method 38 of installing product configuration files into a host environment of a software product, wherein the method 38 might be implemented at the same site as the file editor interface or at a different site (e.g., customer site). In the illustrated example, a product configuration file is received at block 40, wherein the configuration file identifies a set of features and includes a version of the software product as an attribute. Illustrated block 42 provides for reading the version attribute, wherein a determination may be made at block 44 as to whether the version reflected in the configuration file is compatible with the current version of the software product. If so, illustrated block 46 proceeds with installation of the configuration file in the host environment. Otherwise, an error 48 may be generated at block 48, wherein the error may suggest an upgrade of the software product to a higher version.

FIG. 5 shows an architecture 50 in which authoring equipment 52 with a file editor interface 54 is used to generate configuration files for different version levels of a software product. For example, a first computing system 56 may represent a first environment for a test release 58 of the software product, whereas a second computing system 60 may represent a second environment for a development release 62 of the software product. In the illustrated example the authoring equipment 52, which is able to communicate with the first and second computing systems 56, 60, respectively, over a network 64 or other type of connection, generates product configuration files for both the test and development environments. Moreover, the file editor interface 54 may automatically determine the lowest version of the software product that supports the features selected by the programmer, and includes the lowest version as an attribute of the configuration files in order to maximize backwards compatibility for the configuration files.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer implemented method comprising:

outputting one or more prompts via a file editor interface;

receiving an identification of a set of features for a software product via the file editor interface, wherein the set of features includes one or more application programming interface (API) functions and the software product includes a server;

automatically determining, via the file editor interface, a lowest version of the software product that supports the set of features from among a plurality of versions of the software product;

automatically assigning, via the file editor interface, the lowest version of the software product that supports the set of features to a configuration file in response to the automatic determination of the lowest version by adding an attribute to the configuration file that indicates the lowest version of the software product as a level of compatibility, wherein the lowest version of the software product is automatically assigned even when the file editor interface is compatible with a version of the software product that supports the set of features which is higher than the lowest version of the software product; and automatically generating, via the file editor interface, the configuration file for the software product, wherein the configuration file includes an event binding file, identifies the set of features, and indicates the lowest version via the attribute of the configuration file.

2. The method of claim 1, further including excluding version information from the one or more prompts.

3. The method of claim 1, wherein determining the lowest version includes:
- maintaining a list of a plurality of features and corresponding version levels for the software product; and
- comparing the set of features to the list.

4. The method of claim 1, wherein the server includes a customer information control system server.

5. A computer implemented method comprising:
- receiving an identification of a set of features for a software product via a file editor interface;
- determining, via the file editor interface, a lowest version of the software product that supports the set of features from among a plurality of versions of the software product;
- automatically assigning, via the file editor interface, the lowest version of the software product that supports the set of features to a configuration file in response to the automatic determination of the lowest version by adding an attribute to the configuration file that indicates the lowest version of the software product as a level of compatibility, wherein the lowest version of the software product is automatically assigned even when the file editor interface is compatible with a version of the software product that supports the set of features which is higher than the lowest version of the software product; and
- automatically generating, via the file editor interface, the configuration file for the software product, wherein the configuration file identifies the set of features and indicates the lowest version via the attribute of the configuration file.

6. The method of claim 5, further including outputting one or more prompts for entry of the identification of the set of features via the file editor interface.

7. The method of claim 6, further including excluding version information from the one or more prompts.

8. The method of claim 5, wherein determining the lowest version includes:
- maintaining a list of a plurality of features and corresponding version levels for the software product; and comparing the set of features to the list.

9. The method of claim 5, wherein the set of features includes one or more application programming interface (API) functions.

10. The method of claim 5, wherein the configuration file includes an event binding file.

11. The method of claim 5, wherein the software product includes a server.

12. The method of claim 11, wherein the server includes a custom information control system server.

13. The method of claim 2, wherein the one or more prompts display a plurality of features from which the set of features are selected and exclude the version information.

14. The method of claim 13, wherein the file editor interface allows a user to select the set of features without regard to a version level of an execution environment.

15. The method of claim 14, wherein the file editor interface allows the user to select the set of features without having to explicitly set the version level of the execution environment.

16. The method of claim 1, wherein the plurality of versions include two or more versions of the software product that support the set of features, and wherein the file editor automatically determines and automatically assigns the lowest version of the software product that supports the set of features from among the two or more versions.

17. The method of claim 16, wherein the plurality of versions includes one or more versions of the software product that do not support the set of features and one or more versions of the software product that supports an unneeded feature.

18. The method of claim 17, further including excluding the one or more versions of the software product that do not support the set of features and the one or more versions of the software product that supports the unneeded feature to automatically determine the lowest version of the software product that supports the set of features.

19. The method of claim 1, further including providing the configuration file to an execution environment, wherein the configuration file is installed based on a determination that the lowest version of the software product is compatible with a current version of the software product at the execution environment.

20. The method of claim 19, further including generating a plurality of configuration files for a plurality of execution environments, wherein the plurality of execution environments includes a runtime environment and a development environment.

* * * * *